Patented Sept. 19, 1944

2,358,392

UNITED STATES PATENT OFFICE 2,358,392

METHOD OF PURIFYING PYRETHRUM EXTRACT

Lyle D. Goodhue, Berwyn, Md., and Herbert L. J. Haller, Washington, D. C., assignors to Claude R. Wickard, as Secretary of Agriculture of the United States of America, and his successors in office No Drawing. Application October 20, 1942, Serial No. 462,758

1 Claim. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to use of any royalty thereon.

This invention relates to the purification of crude pyrethrum extracts by a process of molecular distillation. In particular, the process has to do with the removal of foreign substances which accompany the active insecticidal ingredients of the crude extract.

The pyrethrum extracts ordinarily used as insecticides have certain disadvantages, in that they cause irritation of the skin of animals or man, and when used as sprays in inhabited places they cause irritation of the respiratory passages. Investigation has shown that pyrethrins I and II, which are active insecticidal ingredients of the extract, if sufficiently pure, do not have these disadvantages. The effects are due to other compounds of plant origin found in the crude extract, and which have not been removed from the ordinarily used extracts. The other compounds are also detrimental in other respects. For example, they, or some of them at least, have obnoxious odors, and they comprise plant pigments which stain clothing and furniture.

Some objects obtained by this invention are the production of a pyrethrum extract free from harsh irritants that cause disagreeable effects upon the respiratory passages or on the skin of man and animals when used as an insecticide; the production of a colorless extract that is free from staining properties when used on light-colored fabrics, walls or other surfaces where staining is particularly objectionable; the production of an extract of pleasing odor; the production of an extract which is composed almost entirely of active ingredients, pyrethrins I and II; the separation of pyrethrins I and II; the removal of waxes, terpenes, phenols, acids, plant pigments and other impurities from the crude extract; and other objects which will be apparent from the following description and claim.

Small amounts of pyrethrum extracts which were previously partially purified by chemical means have been further purified in the laboratory by the process of molecular distillation. However, the direct purification by molecular distillation of crude pyrethrum extract has not heretofore been possible because the violent foaming prevented the removal of gaseous components.

We have found that this difficulty can be completely eliminated by the addition of a quantity of oil. A vegetable oil, such as sesame oil, cottonseed oil, olive oil, or other vegetable oil, which is liquid at the customary room temperature, is satisfactory. Also, a mineral oil having a high boiling point will serve the purpose. In general, the oils used have been freed of materials that distill at temperatures corresponding to the distillate temperature of the pyrethrins to prevent their contamination, but this step is not necessary to prevent foaming.

One part of oil to two parts of a crude pyrethrum extract, which contains 20 percent to 25 percent pyrethrins, is preferable, but the proportions may be varied within limits of one-fourth to one part of oil, to two parts of the extract, depending on other conditions.

That sesame oil increases the toxicity of pyrethrum extracts is known. Further experiments have shown that the active toxic ingredients, sesamin and related compounds, can be completely removed from the oil by molecular distillation. In using sesame oil, which has not been distilled to remove the sesamin and related materials, as an anti-foaming agent, it is possible to combine two operations. The sesamin, because it has approximately the same distilling temperature as that of the pyrethrins, is distilled from the oil with distillation of the crude pyrethrum extract, and is collected in the distilled fraction, thus giving pyrethrins in concentrated and purified form increased in toxicity by addition of the sesamin from the sesame oil.

No special type of design of molecular or short path still is necessary. The distillation has been carried out in both the pot or batch type and the continuous type stills. The continuous type still is preferable, however, because the length of time the substance is heated is less and the degree of change by polymerization or decomposition is reduced. A short path still of the falling film type is very satisfactory. In one of these stills the pyrethrins distill very readily at 150° C. under a pressure of 0.1 mm. of mercury.

Pyrethrin I distills more readily than pyrethrin II, and is removed in greater proportion during the first stages of distillation. In the latter stages, pyrethrin II predominates. If separation is desired, distillation can be carried out quite readily at 100° C. under a pressure of 0.1 mm., resulting in a fraction high in pyrethrin I, and the temperature can then be raised to 160° C., in order to collect a fraction high in pyrethrin II. By repeating the fractional distillations, a very complete separation may be obtained. In all cases the distillates are pale yellow liquids with pleasing odors. The fraction distilled at the lower temperature contains little or no wax, but the higher temperature distilled fraction contains a quantity of wax ranging up to 10 percent.

The temperature of distillation may be reduced or the rate increased by lowering the pressure. It is not necessary to use pressures lower than 0.1 mm. for the removal of 90 to 95 percent of the active ingredients. With such pressures simple equipment may be used. The ordinary type high vacuum mechanical oil pump is satisfactory. A diffusion pump is not necessary, but its use will increase the rate of distillation of the fractions distilled at the higher temperatures.

What is claimed is:

A process for producing a mixture of purified pyrethrum extract and sesamin compounds comprising the molecular distillation of non-pure pyrethrum extract with sesame oil, whereby the oil acts as an anti-foaming agent, and collecting the distillate fraction containing a mixture of the purified pyrethrum extract and sesamin.

LYLE D. GOODHUE.
HERBERT L. J. HALLER.